United States Patent
Lee (10) Patent No.: US 9,265,121 B2
(45) Date of Patent: Feb. 16, 2016

(54) OLED POWER DRIVER CIRCUIT

(71) Applicant: Gilbert S. Lee, Saratoga, CA (US)

(72) Inventor: Gilbert S. Lee, Saratoga, CA (US)

(73) Assignee: Alpha and Omega Semiconductor Incorporated, Sunnyvale, CA (US)

( * ) Notice: Subject to any disclaimer, the term of this patent is extended or adjusted under 35 U.S.C. 154(b) by 0 days.

(21) Appl. No.: 14/064,064

(22) Filed: Oct. 25, 2013

(65) Prior Publication Data

US 2015/0115825 A1    Apr. 30, 2015

(51) Int. Cl.
H05B 33/08    (2006.01)

(52) U.S. Cl.
CPC ................... *H05B 33/0896* (2013.01)

(58) Field of Classification Search
None
See application file for complete search history.

(56) References Cited

U.S. PATENT DOCUMENTS

| | | | |
|---|---|---|---|
| 2009/0072752 A1* | 3/2009 | Hente et al. | 315/241 R |
| 2011/0007054 A1 | 1/2011 | Kim | |
| 2011/0204797 A1* | 8/2011 | Lin et al. | 315/161 |
| 2013/0235010 A1 | 9/2013 | Park | |
| 2013/0320954 A1* | 12/2013 | Capofreddi et al. | 323/311 |

FOREIGN PATENT DOCUMENTS

| | | |
|---|---|---|
| KR | 10-2011-0005498 A | 1/2011 |
| TW | 200729134 A | 8/2007 |
| TW | 201318481 A | 5/2013 |
| TW | M457371 U | 7/2013 |

* cited by examiner

*Primary Examiner* — Douglas W Owens
*Assistant Examiner* — Dedei K Hammond (57) ABSTRACT

An efficient, cost effective power driver for OLED panels is configured with a small BOM without compromising the display quality. The power driver adopts only one Inverting Buck-Boost Converter (IBBC) to regulate the necessary output voltage for the OLED panel load. The output voltage to drive the OLED panel load is supplied by the IBBC and the positive input of the OLED panel is tied into the input power supply of VIN directly without any switch. A DC-DC converter is provided to generate a reference ground and drive the associated control circuits. The input DC voltage VIN is utilized as a reference voltage for both the IBBC and the DC-DC converter.

11 Claims, 9 Drawing Sheets

FIGURE 1

(PRIOR ART)

OLED POWER DRIVER CIRCUIT

FIELD

The present disclosure relates to power drivers for OLED (organic light-emitting diode) panels.

BACKGROUND

Connectivity being the buzzword today, mobile systems and displays demand efficient and longer battery usage and smaller BOM (Bill Of Materials) for a thinner and more compact form factor. Additionally, display quality is the most important performance feature that cannot be compromised even during heavy load current fluctuation, associated large drop-out voltage transition due to it and switching noise from the employed DC-DC converters.

Conventional displays adopt dual output DC-DC drivers where the two outputs are referred as ELVDD (Positive output) and ELVSS (Negative output). The dual outputs supply opposing currents with almost same absolute values and positive and negative voltages related to each display panel load. Each panel has different output current and voltage levels requirements based on the application such as panel size, pixel numbers, display quality, adopted process generation, and the like.

DC-DC drivers typically comprise a boost (step-up), buck (step-down) type DC-DC converter or LDO (Low Dropout) regulators for the positive output and an inverting buck-boost (step-down and step-up) type DC-DC converter for the negative output. Although DC-DC converters have been employed traditionally as it increases the energy efficiency, the power loss from the typically employed 4 nos. switches (2 nos. for positive, 2 nos. for negative) deteriorates the overall efficiency of the driver.

Implementing 4 nos. power switches and 2 nos. controllers for each converter increases total BOM cost and the solution area. Moreover, power switches are very expensive and need more area to get smaller Rds (on) resistance for better efficiency. Each controller is required to be designed carefully to be stable under light or heavy load and even abrupt line or load transients. Additionally, the two DC-DC converters need two expensive and voluminous inductors whose switching operations bring about switching noise/ripple and the different switching noises make them interfere with each other. As a result, it is hard to get a good display quality from dual output DC-DC converters.

There is therefore felt a need for providing cheap and compact drivers with improved efficiency, better power management capability, and having reduced effects on display quality caused by switching operations.

OBJECTS

Some of the objects of the present disclosure aimed to ameliorate one or more problems of the prior art are described herein below:

An object of the present disclosure is to provide an efficient power driver for OLED panels.

Another object of the present disclosure is to provide a reliable power driver for OLED panels.

Still another object of the present disclosure is to provide a cost effective power driver for OLED panels.

Yet another object of the present disclosure is to provide a power driver for OLED panels having a configuration that involves relatively lesser number of elements need for a smaller BOM.

Still another object of the present disclosure is to provide a compact power driver for OLED panels.

One more object of the present disclosure is to provide a power driver for OLED panels that has minimal effect on display quality due to the effects of switching operations.

Other objects and advantages of the present disclosure will be more apparent from the following description when read in conjunction with the accompanying figures, which are not intended to limit the scope of the present disclosure.

SUMMARY

In accordance with an aspect of the present disclosure, there is provided a driver circuit for an OLED (organic light-emitting diode) panel load having a first terminal and a second terminal, the driver circuit comprising:
  a source of DC power supply connected to a first node and further connected to the first terminal of the load;
  a first Inverting Buck-Boost Converter (IBBC) adapted to receive the input DC voltage and provide a regulated DC output voltage to drive the load, the first IBBC comprising a first switch coupled between the first node and a second node; an inductor coupled between the second node and a system ground; a second switch coupled between the second node and the second terminal of the load; and a first capacitor coupled between the first terminal and the second terminal of the load;
  a first control circuit coupled to the first IBBC, the first control circuit adapted to control switching times of the first switch and the second switch; and
  a first DC-DC converter comprising a second capacitor and an associated second control circuit, the first DC-DC converter adapted to generate a reference ground for the first control circuit and the second control circuit and further adapted to generate a positive voltage across the second capacitor.

Additionally, the driver circuit may comprise a second DC-DC converter adapted to provide bias power to the load, the second DC-DC converter being selected from the group of converters consisting of a linear regulator, a linear regulator coupled to a buffer amplifier, and a second Inverting Buck-Boost converter (IBBC).

The first switch and the second switch may be selected from the group of semiconductor devices consisting of MOSFETs, BJTs and IGBTs.

The first DC-DC converter may be selected from the group of converters consisting of a linear regulator, a linear regulator coupled to a buffer amplifier, and a second Inverting Buck-Boost converter (IBBC) comprising switches selected from the group of semiconductor devices consisting of MOSFETs, BJTs and IGBTs.

The circuit may comprise at least one of discrete components, integrated circuits (ICs) for each component, or a monolithic integrated circuit.

In accordance with another aspect of the present disclosure, there is provided a driver circuit for a solid state lighting load having three terminals and receiving input DC power supply, the driver circuit comprising:
  a second Inverting Buck-Boost Converter (IBBC) adapted to apply the input DC voltage as its reference voltage and provide a regulated DC output voltage to drive the load between two load terminals; and
  a third DC-DC converter—normally Boost converter—adapted to provide bias power higher than the input DC voltage to the load at the third terminal.

The second DC-DC converter may be selected from the group of converters consisting of a linear regulator, a linear regulator coupled to a buffer amplifier, and a second Inverting Buck-Boost converter (IBBC).

Switches comprising the third DC-DC converter may be selected from the group of semiconductor devices consisting of MOSFETs, BJTs AND IGBTs.

The circuit may comprise at least one of discrete components, integrated circuits (ICs) for each component and a monolithic integrated circuit.

In accordance with yet another aspect of the present disclosure, there is provided a method of driving an OLED (organic light-emitting diode) panel load, the method comprising the following steps:
   providing an Inverting Buck-Boost Converter (IBBC) to receive input DC voltage and drive the OLED panel load with a regulated output voltage;
   providing a DC-DC converter to generate a reference ground and drive associated control circuits; and
   utilizing the input DC voltage as a reference voltage for the IBBC and the DC-DC converter.

BRIEF DESCRIPTION OF THE ACCOMPANYING DRAWINGS

A power driver circuit, for an OLED (organic light-emitting diode) panel load, in accordance with the present disclosure will now be described in relation to the accompanying drawings.

Corresponding reference numerals/indicia indicate corresponding parts throughout the several views of the accompanying drawings.

DETAILED DESCRIPTION

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted likewise (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The use of the expression "at least" or "at least one" suggests the use of one or more elements or ingredients or quantities, as the use may be in the embodiment of the disclosure to achieve one or more of the desired objects or results.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

Figure 1:
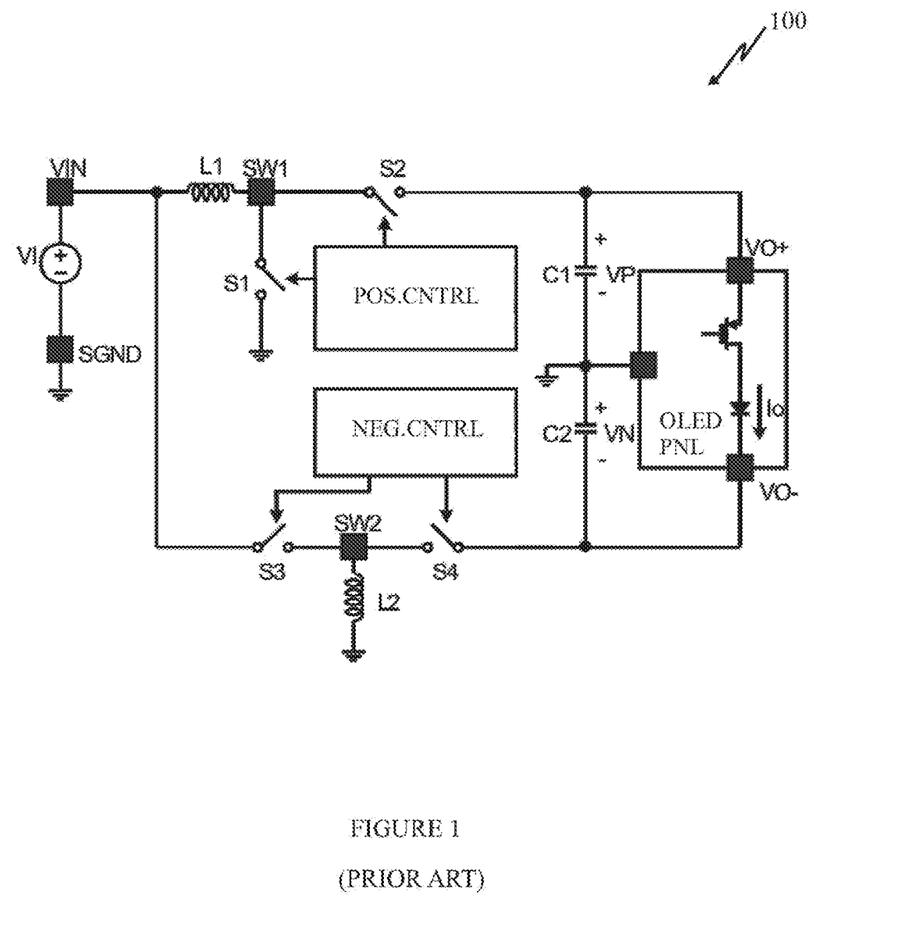
FIG. 1 illustrates a schematic representation of a conventional OLED power driver using dual outputs.

FIG. 1 illustrates a schematic representation of a conventional OLED power driver (100) using dual outputs wherein a boost converter provides a positive output and an inverting buck-boost converter provides a negative output. The positive converter (boost converter) comprises two power switches (S1, S2), an inductor (L1), a capacitor (C1) and its controller (POS.CNTRL) to regulate the positive output. The negative converter (Inverting Buck-Boost Converter) comprises two power switches (S3, S4), an inductor (L2), a capacitor (C2) and its controller (NEG.CNTRL) to regulate the negative output. The OLED panel load (OLED PNL) includes OLEDs for luminance and control circuit like TFTs, capacitors, etc. for controlling OLED current (Io).

Figure 2:
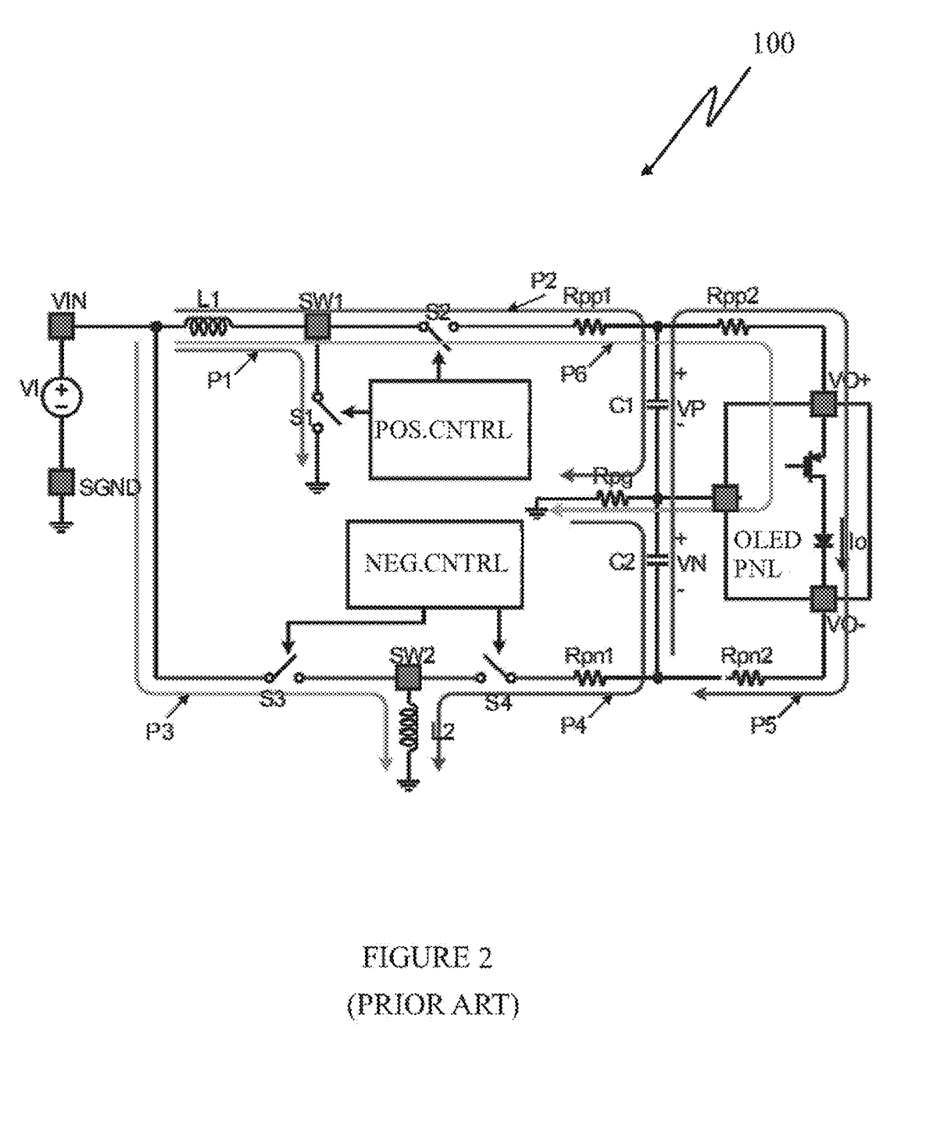
FIG. 2 illustrates a schematic representation of the paths of power flow in the conventional OLED power driver of FIG. 1.

FIG. 2 illustrates a schematic representation of the paths of power flow in the conventional OLED power driver (100) of FIG. 1. The power flow paths are generally referenced as below:
P1: ON-time path of positive converter
P2: OFF-time path of positive converter
P3: ON-time path of negative converter
P4: OFF-time path of negative converter
P5: Load current path
P6: Current path for control circuits to drive OLED.

P1 and P3 show ON-time paths to regulate each output of positive and negative DC-DC converters and P2 and P4 are OFF-time paths. The stored energies in each inductor (L1, L2) during P1 and P3 period are conveyed to the OLED panel during the time that paths P2 and P4 are conducting. The conveyed energy also charges each output capacitor (C1, C2). The required output current (Io) in the OLED panel is supplied by the inductor(L1, L2) and the output capacitors (C1, C2) and then most of the output current by the positive DC-DC converter flows to the negative DC-DC converter through the path P5 from VO+ (or ELVDD) to VO− (or ELVSS). A small current which plays the role of controlling the internal circuit of the OLED panel flows through the ground reference via path P6.

The main drawbacks of the conventional power driver as illustrated in FIG. 1 include compromised display quality, poor efficiency and increased cost and BOM.

Ground bouncing: The negative converter (Inverting Buck-Boost converter) operates independent of the positive converter (boost converter). Their switching frequencies are not synchronized and their duties (ON-time) are different. Due to this lack of synchronicity the ground parasitic resistance Rpg makes a big ground bouncing noise voltage because of the difference of the current flows between paths P2 and P4. The current difference with pulsating waveform generates a big ground bouncing voltage due to parasitic resistance and inductance. This noise deteriorates the display quality.

Limited performance of positive output: The positive output has a bigger impact on the display quality and then its resolution and accuracy specifications are more stringent than that of the negative output. However, since the conventional positive output using a switching type DC-DC converter has a limited bandwidth by its switching frequency (fsw) and ripple by capacitor, Io, fsw, etc. these limitations result in lower resolution and accuracy than a linear type DC-DC converter like linear regulator.

Interference: The interference or cross-talk between two DC-DC converters due to the parasitic operation in a monolithic integrated circuit or PCB may be a big issue on the display quality. Especially under light load conditions, when each converter operates in a different mode or when line or load transients happen abruptly, this issue will be more severe. Generally, human eye can distinguish a shade of brightness difference in the dim light. That is, the interference issue takes place frequently in the light load (dim light).

Number of elements: As illustrated in FIG. 1, at least 4 nos. power switches, 2 nos. inductors, 2 nos. capacitors (4 nos. capacitors including 2 nos. input capacitors) and 2 nos. controllers are required to regulate the positive and negative outputs.

Bigger power loss: The number of power switches required as illustrated in FIG. 1 causes bigger power loss due to conduction as well as switching power loss. The large sized power switches for small conduction loss increase switching loss and cost. Again, the two voluminous inductors increase cost and power loss.

Tricky Compensation: Use of two controllers requires duplication of feedback and compensation circuits for their respective stable operations.

Cost: As a result of the aforementioned drawbacks, the conventional power drivers for OLED panels using dual output converters are less efficient and more expensive.

Figure 3:
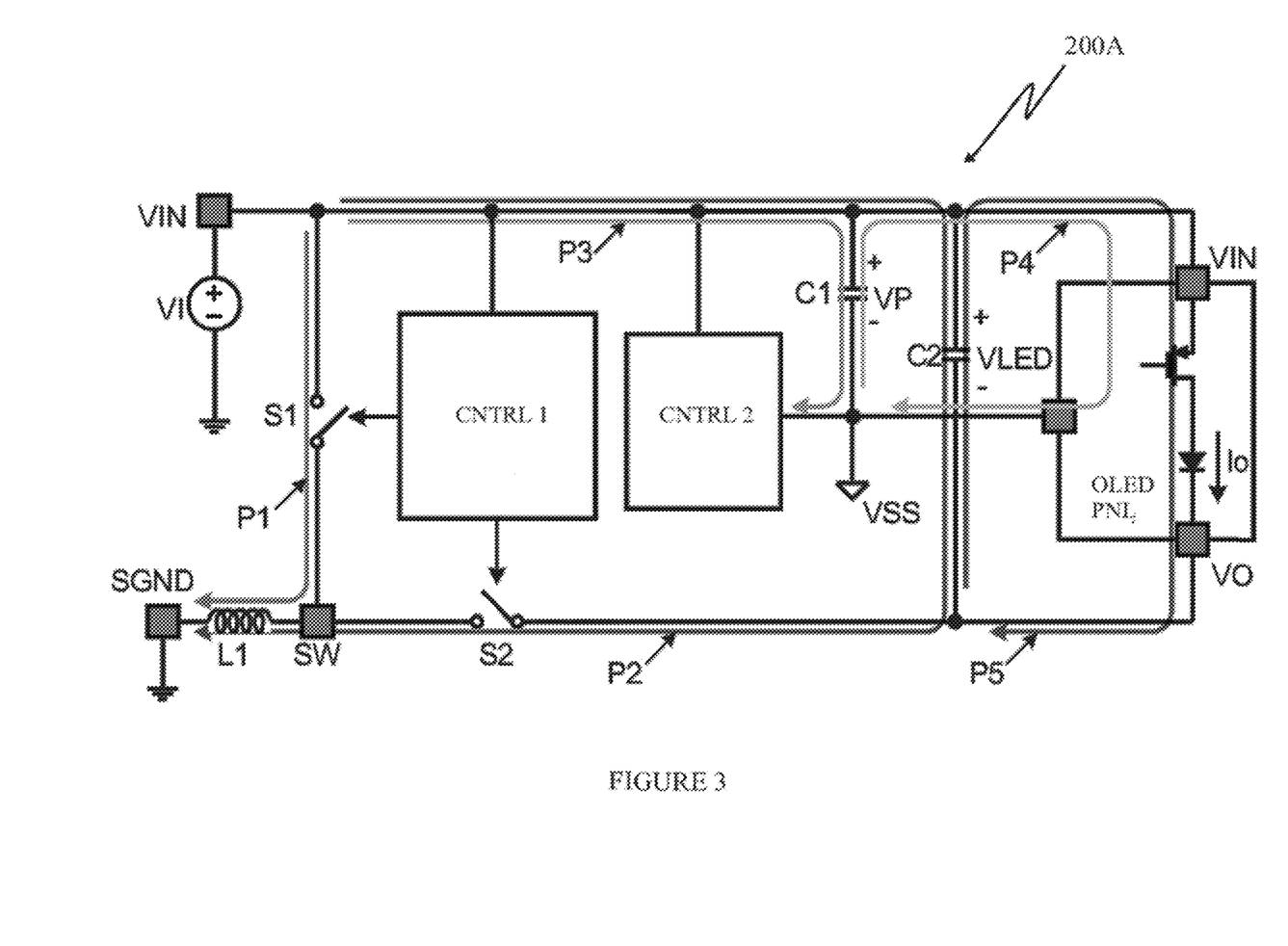
FIGS. 3, 4 and 5 illustrate schematic representations of an OLED power driver in accordance with various embodiments of the present disclosure.
Figure 4:
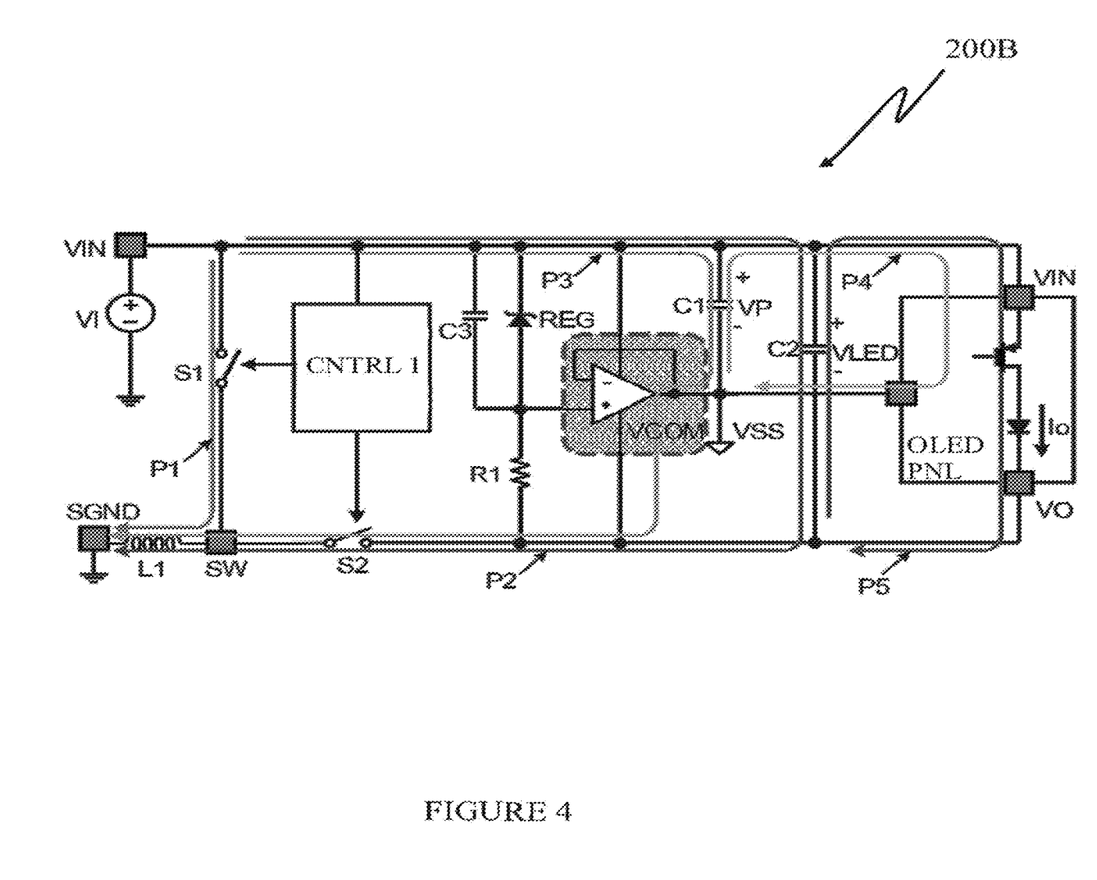
Figure 5:
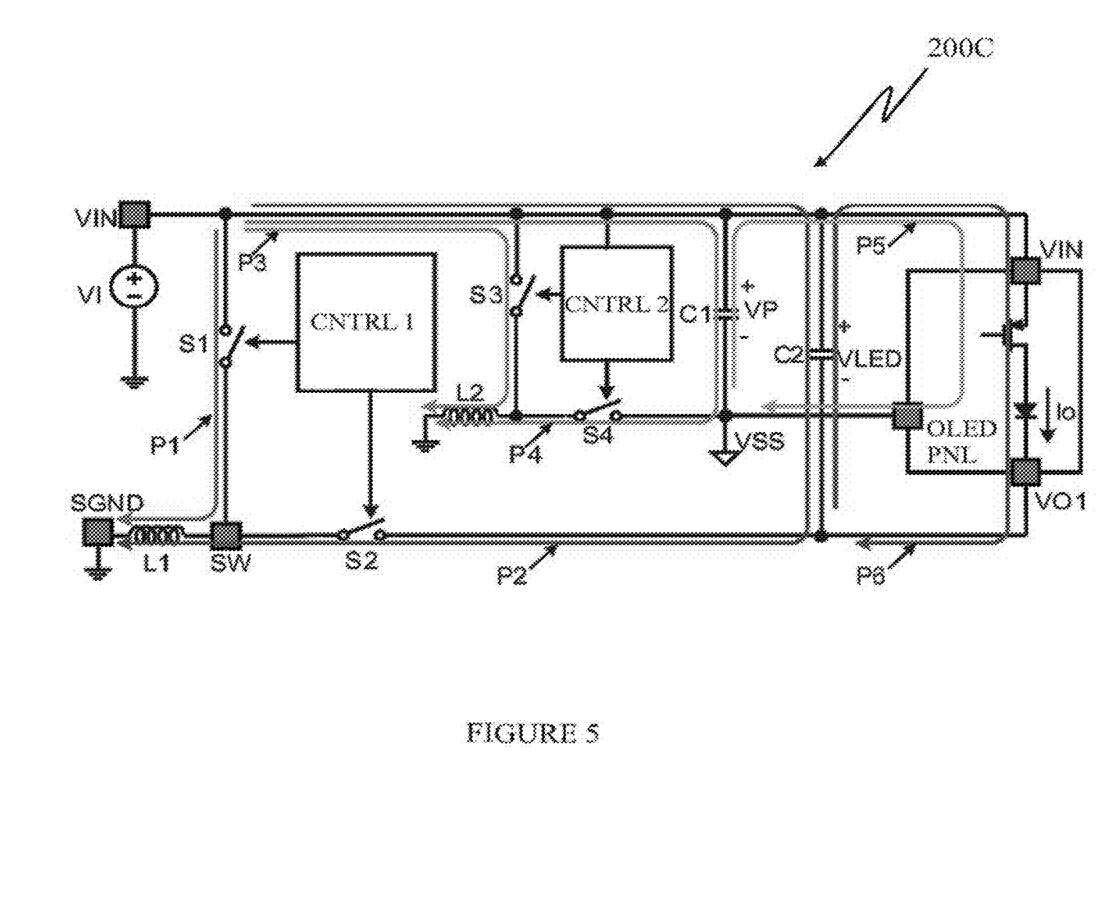

FIGS. 3, 4 and 5 illustrate schematic representations of an OLED power driver in accordance with various embodiments (200A, 200B and 200C) of the present disclosure. The power flow paths are generally referenced as below:
P1: ON-time path of IBBC for OLED driving
P2: OFF-time path of IBBC for OLED driving
P3: Charging path for control circuits of OLED
P4: Discharging path for control circuits of OLED
P5: OLED driving current path The power driver of the present disclosure adopts only one Inverting Buck-Boost Converter (IBBC1) to regulate the necessary output voltage (ELVSS) for the OLED panel load (OLED PNL). The output voltage to drive the OLED panel load (OLED PNL) is supplied by the IBBC and the positive input of OLED (ELVDD) is tied into the input power supply of VIN directly without any switch.

In FIG. 3 illustrating an embodiment (200A) of the power driver, the IBBC1 comprises two power switches (S1, S2), an inductor (L1), a capacitor (C2) and its controller (CNTRL 1) to provide output VLED. A DC-DC converter comprising a capacitor (C1) and its controller (CNTRL 2) is provided to generate a positive voltage VP across.

Since the driving current for the OLED load is generated by the IBBC itself, there is no ground path current causing any ground bouncing like P6 in FIG. 1. The use of a single DC-DC converter also eliminates of interference or cross-talk and makes the display quality better.

Again, the consumption current for the control circuits in the OLED panel is much smaller than the OLED driving current (Io). Accordingly, the DC-DC converter for the positive output (VP or VSS generator) does not need big current capability and is easier to design for better performance.

The positive output voltage, VP in FIG. 1 is the same as the voltage difference between VIN and VSS in FIG. 3, and the negative output voltage, VN in FIG. 1 is related to the voltage difference between VSS and VO in FIG. 3. The applied input voltage to OLED panel, VP+VN in FIG. 1 is the same as the voltage difference (VLED) between VIN and VO in FIG. 3.

In an alternative embodiment, the DC-DC converter of FIG. 3 for the positive output (VP) generator is a linear regulator with wide bandwidth and excellent PSRR (Power Supply Ripple Rejection) without switching noise and its controller, as illustrated in the embodiment (200B) of FIG. 4. In FIG. 4, a linear regulator is symbolized as a Zener Diode, which plays role of a shunt regulator. The buffer amplifier (VCOM) is optional for heavy current sinking in VSS because the REG (a shunt regulator) has only one-way (sourcing) current driving capability. The power flow paths are generally referenced as below:
P1: ON-time path of IBBC for OLED driving,
P2: OFF-time path of IBBC for OLED driving
P3: Charging path for control circuits of OLED
P4: Discharging path for control circuits of OLED
P5: OLED driving current path Still another embodiment (200C) of FIG. 5 illustrates an alternative embodiment wherein the DC-DC converter is another Inverting Buck-Boost Converter (IBBC2) comprising two power switches (S3, S4), an inductor (L2), a capacitor (C1) and its controller (CNTRL 2). IBBC2 provides higher efficiency in case of large controlling current for the OLED panel load (OLED PNL). The power flow paths are generally referenced as below:
P1: ON-time path of IBBC1 for OLED driving,
P2: OFF-time path of IBBC1 for OLED driving
P3: ON-time path of IBBC2 for control circuits of OLED
P4: OFF-time path of IBBC2 for control circuits of OLED
P5: OLED controlling current path
P6: OLED driving current path Since the use of a linear regulator in FIG. 4 can cause additional power loss during heavy current flow, providing the additional IBBC (IBBC 2) as illustrated in FIG. 5 increases the efficiency of the power driver but results in a poorer regulation characteristic and more part numbers than a linear regulator.

Figure 6:
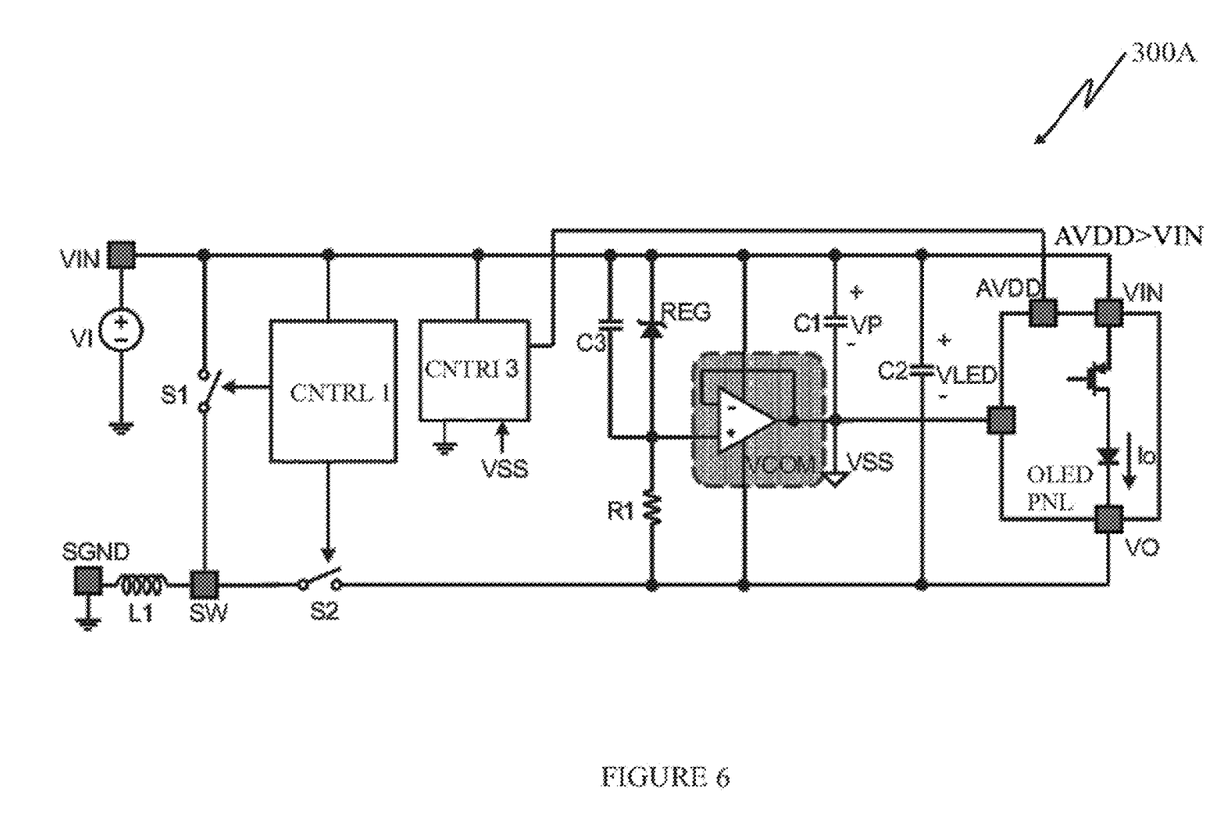
FIGS. 6, 7 and 8 illustrate schematic representation of an OLED power driver with an additional bias power to a load in accordance with various embodiments of the present disclosure.
Figure 7:
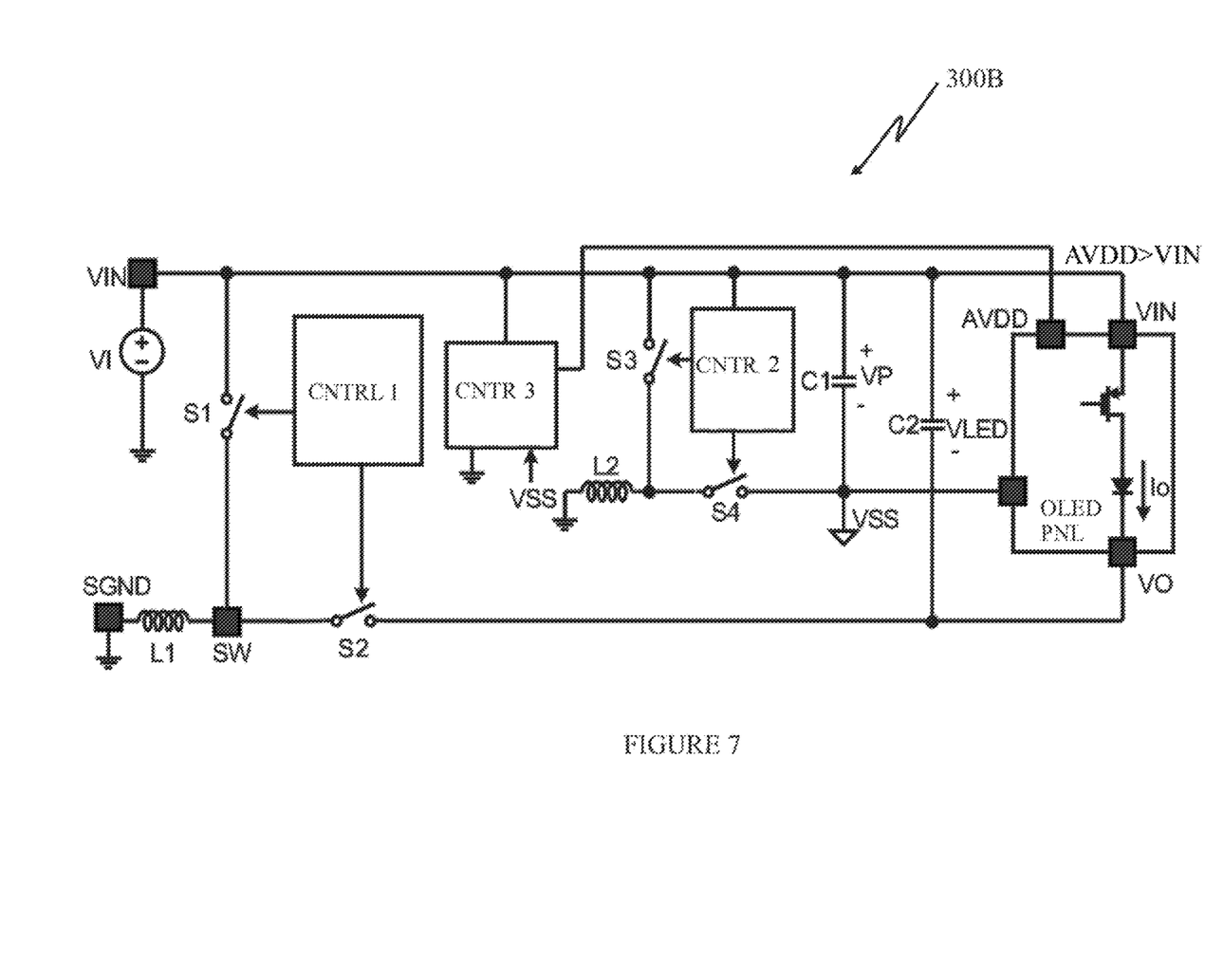
Figure 8:
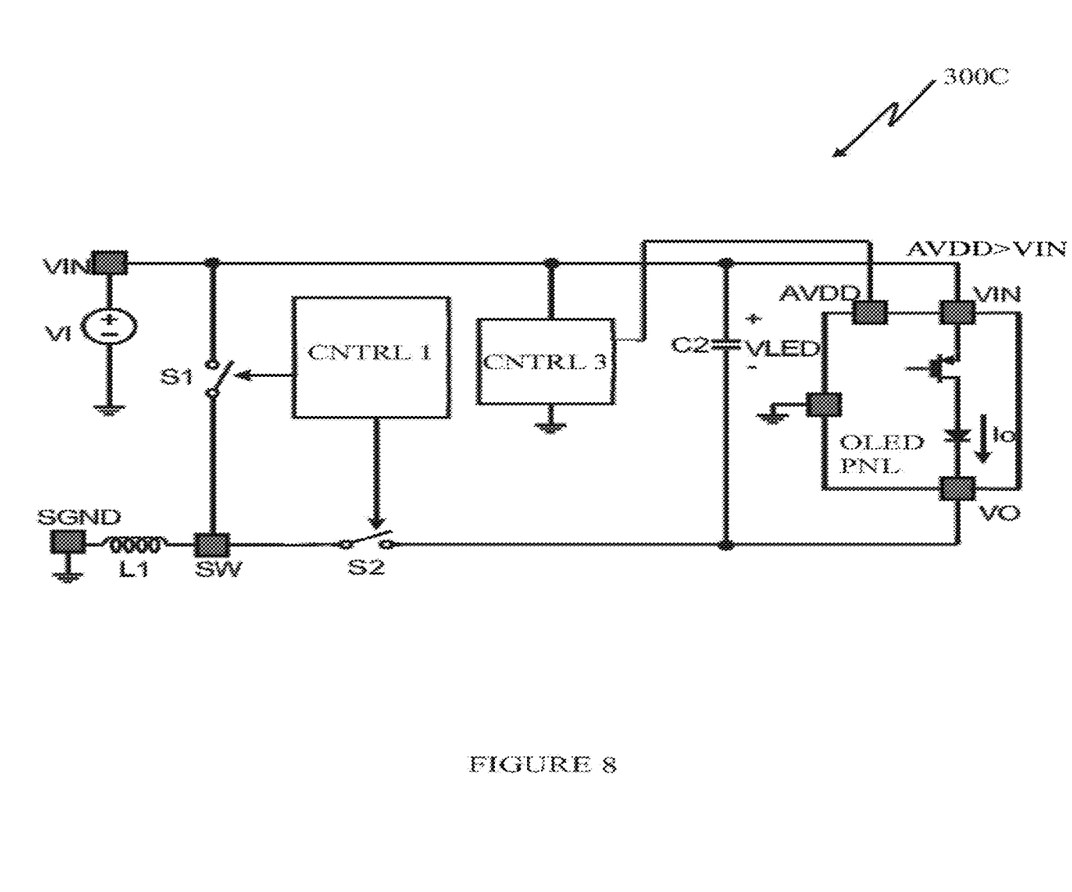

FIGS. 6, 7 and 8 illustrate schematic representation of an OLED power driver with an additional bias power (AVDD) to a load in accordance with various embodiments (300A, 300B, 300C) of the present disclosure.

The embodiments 300A, 300B and 300C find application in mobile devices implementing OLED drivers with 3 outputs. The power driver in embodiment 300A comprises a first Inverting Buck-Boost converter (IBBC1) for driving the OLED panel load (OLED PNL) with its controller (CNTRL 1), a second DC-DC converter comprising a linear regulator (REG) with a buffer amplifier (VCOM) for associated control circuits and a third DC-DC converter for panel bias power (AVDD) with its controller (CNTRL 3). The buffer amplifier (VCOM) is optional for heavy current sinking in VSS because the REG (a shunt regulator) has only one-way (sourcing) current driving capability.

In the OLED panel there are several p-channel TFTs (Thin Film Transistors) and even though the gate-source of TFT is short, that is, VGS=0V, there may be some leakage current. An additional output, AVDD, is usually higher than the source of p-channel TFT in OLED panel in order to turn it OFF completely. Therefore, if the gate of TFT is higher than its source it will be turned OFF completely and then its leakage current will become negligible.

In an alternative embodiment 300B as illustrated in FIG. 7, the power driver comprises a first Inverting Buck-Boost converter (IBBC1) for driving the OLED panel load (OLED PNL) with its controller (CNTRL 1), a second Inverting Buck-Boost converter (IBBC2) for driving associated control circuits with its controller (CTRL 2) and a third DC-DC converter for panel bias power (AVDD) with its controller (CNTRL 3).

In another alternative embodiment 300C as illustrated in FIG. 8, the power driver comprises a first Inverting Buck-Boost converter (IBBC1) for driving the OLED panel load (OLED PNL) with its controller (CNTRL 1) and a third DC-DC converter for panel bias power (AVDD) with its controller (CNTRL 3). The positive voltage VP is not regulated but follows VIN because if VIN is stable, the need for an additional DC-DC converter for VP generation is eliminated.

Figure 9:
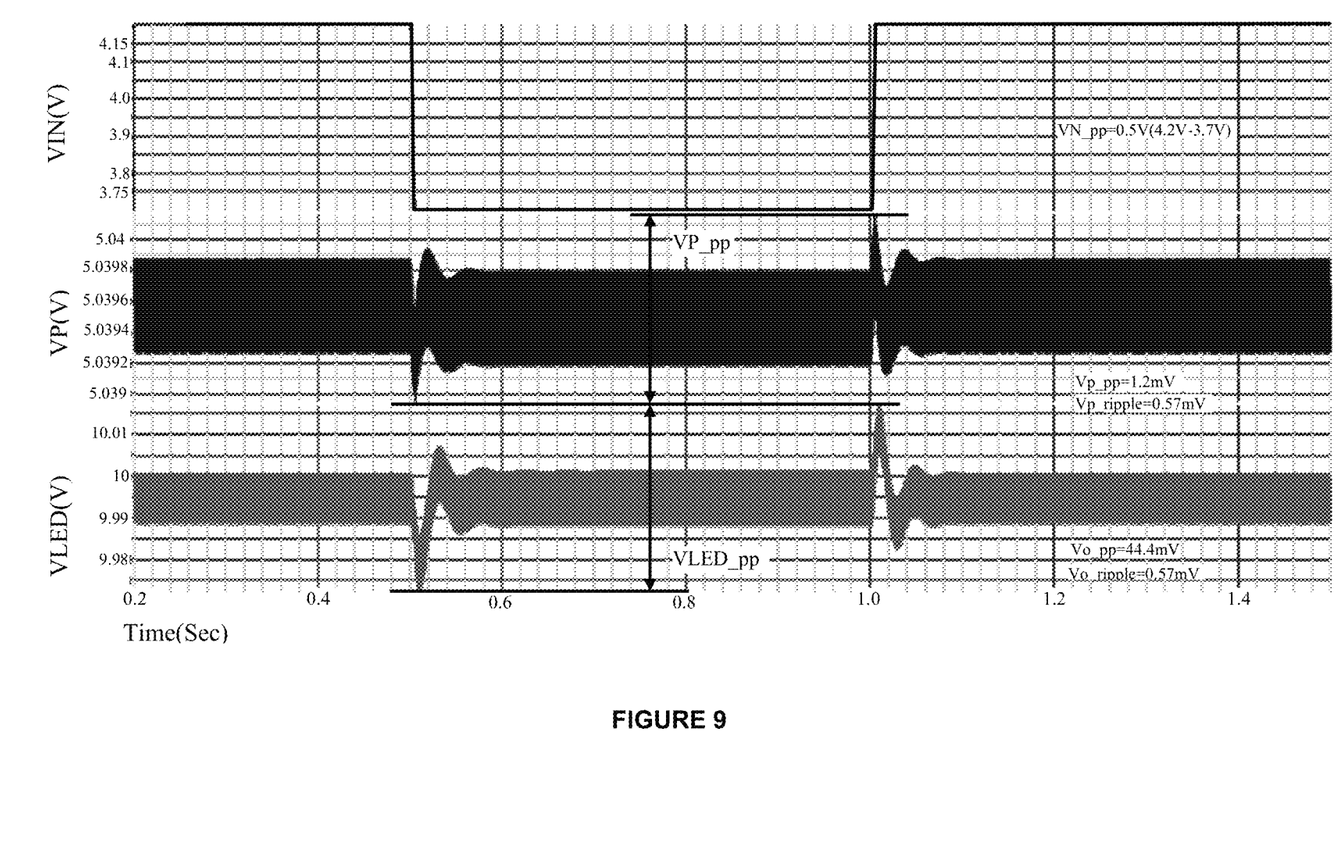
FIG. 9 illustrates graphical representations of Voltages Vin (Input voltage), Vp (positive output voltage) and VLED (boosted OLED driving voltage) versus time.

The line transient performance is one of the most important specifications in AMOLED driving and when VIN changes abruptly, FIG. 9 as a simulation result illustrates graphical representations of Voltages Vin (Input voltage), VP (positive output voltage) and VLED (boosted OLED driving voltage) versus time based on the configuration of FIG. 4. These simulation results show much smaller ripple in the positive output, VP.

Conditions: Io=300 mA, I_P4=5 mA, C1=1 nF, C2=10 g, C3=10 nF, L1=5 µH, VP=5V, VLED=10V, Fsw=1.5 MHz, VIN=4.2V ↔ 3.7V (tr=tf=5 µs) VP_pp=1.2 mV, VLED_pp=44.4 mV The OLED drivers of the present disclosure eliminates one of the important drawbacks of conventional OLED power drivers in that it provides better line regulation and line transient performance for good display quality. The graphical illustrations of FIG. 9 show that the OLED driver circuits of the present disclosure provide better line regulation and transient performance in VP voltage which has a significant impact on the display quality.

The driving circuits described in accordance with the present disclosure can be implemented using discrete components, integrated circuits (ICs) for each component or a monolithic integrated circuit. For instance, in the driver circuit of FIGS. 4 and 5, the power switches S1 and S2 are discrete switches like BJTs, MOSFETs and the like and a single chip includes the converter controller integrated circuit. In FIG. 5, the power switches S3 and S4 are discrete switches like BJTs, MOSFETs and the like, and a single chip includes the converter controller. In FIG. 4, the regulator (REG) and the buffer amplifier (VCOM) can be discrete components or built in an integrated circuit with the IBBC. In FIG. 5, the additional IBBC (IBBC 2) can be built in the integrated circuit along with IBBC1.

The power driver of the present disclosure thus provides, first, better display performance due to reduced noise, and second, cost reduction and better efficiency by reducing the number of power switches and inductors or using lower rated components as compared to those in the prior art.

Display Quality: Since the current of each OLED pixel is programmed and controlled by p-channel TFTs (Thin Film Transistors) whose sources are referenced by the positive voltage (VP), the display quality intends to depend on the positive output. The driver circuits of the present disclosure provide good noise immunity because the positive voltage looks like it is isolated from the negative output. The positive node of OLED is hard-wired to VIN and its reference ground, VSS, is generated by a wide bandwidth linear regulator with good PSRR or by a Switching Converter like another Inverting Buck-Boost converter (IBBC) for better efficiency in case of large controlling current for the OLED panel. So, since two outputs' common reference is not a ground but VIN and there is no any mutual interference path due to a common ground in previous art, the noise of the negative output makes a little effect on the reference ground, VSS, of the positive output. Moreover, ground bouncing due to the current flowing through VSS becomes much smaller than in conventional circuits. Therefore, the much smaller ground bouncing and interference have an effect on the better display quality.

Efficiency and BOM Cost: The driver circuits of the present disclosure need only one IBBC comprising 2 power switches and its controller to regulate the OLED panel load and a DC-DC converter comprising for instance, a shunt regulator and a buffer amplifier, to address the positive output voltage, VP. Since the DC-DC converter drives a much smaller current than the power path of the IBBC, a small BOM is needed. The buffer amplifier is optional and required to be provided based on the application and is only necessary when both sinking and sourcing current capabilities are required. In the alternative embodiment, the positive output is generated by a switching DC-DC converter like another IBBC when the control circuit needs considerable current consumption. However, its consumption current is quite smaller than the OLED driving current (Io) and so, the IBBC is smaller and lighter than the main IBBC for driving Io. The driver circuits of the present disclosure involve smaller conduction losses, fewer and lighter power switches, inductor and regulation controller thus providing a solution that is competitive where both cost and size are concerned.

Technical Advancements and Economic Significance

The technical advancements offered by the present disclosure include the realization of:
an efficient power driver for OLED panels;
a reliable power driver for OLED panels;
a cost effective power driver for OLED panels;
a power driver for OLED panels having a configuration that involves relatively lesser number of elements and hence the need for a small BOM;
a compact power driver for OLED panels; and
a power driver for OLED panels that has minimal effect on display quality by the effects of switching operations.

The invention claimed is:

1. A driver circuit for an OLED (organic light-emitting diode) panel load having a first terminal and a second terminal, said driver circuit comprising:
a source of input DC voltage connected to a first node and further connected to the first terminal of the load;
a first Inverting Buck-Boost Converter (IBBC) adapted to receive the input DC voltage and provide a regulated DC output voltage, a negative voltage, to drive the load, said first IBBC comprising:

a first switch coupled between the first node and a second node, the first node disposed between the source of input DC voltage and the second node;

an inductor coupled between the second node and a system ground;

a second switch coupled between the second node and the second terminal of the load; and a first capacitor coupled between the first terminal and the second terminal of the load;

a first control circuit coupled to said first IBBC, said first control circuit adapted to control switching times of the first switch and the second switch; and a second DC-DC converter comprising a second capacitor and an associated second control circuit, said second DC-DC converter adapted to generate a reference ground for said first control circuit and said second control circuit and further adapted to generate a positive voltage across the second capacitor.

2. The driver circuit as claimed in claim 1 further comprising a third DC-DC converter adapted to provide additional bias power to the load.

3. The driver circuit as claimed in claim 1, wherein the first switch and the second switch in said first IBBC are selected from the group of semiconductor devices consisting of MOSFETs, BJTs and IGBTs.

4. The driver circuit as claimed in claim 1, wherein said second DC-DC converter is selected from the group of converters consisting of a linear regulator, a linear regulator coupled to a buffer amplifier, and a second Inverting Buck-Boost converter (IBBC) comprising switches selected from the group of semiconductor devices consisting of MOSFETs, BJTs and IGBTs.

5. The driver circuit as claimed in claim 2, wherein said third DC-DC converter being selected from the group of converters consisting of a step-up DC-DC converter like charge pump and Boost Converter comprising switches selected from the group of semiconductor devices consisting of MOSFETs, BJTs and IGBTs.

6. The driver circuit as claimed in claim 1, wherein said circuit comprises at least one of discrete components, integrated circuits (ICs) for each component, or a monolithic integrated circuit.

7. A driver circuit for a solid state lighting load having a first terminal, a second terminal, and a third terminal, said driver circuit comprising:

a first Inverting Buck-Boost Converter (IBBC) adapted to receive an input DC voltage and provide a regulated DC output voltage to drive the first terminal and the second terminal; and a third DC-DC converter adapted to provide bias power higher than the input DC voltage to the solid state lighting load at the third terminal, whereby completely turning off a thin film transistor connected in series with an LED within the solid state lighting load.

8. The driver circuit as claimed in claim 7, wherein a first switch and a second switch in said first IBBC are selected from the group of semiconductor devices consisting of MOSFETs, BJTs and IGBTs.

9. The driver circuit as claimed in claim 7, wherein said third DC-DC converter being selected from the group of converters consisting of a step-up DC-DC converter like charge pump and Boost Converter comprising switches selected from the group of semiconductor devices consisting of MOSFETs, BJTs and IGBTs.

10. The driver circuit as claimed in claim 7, wherein said circuit comprises at least one of discrete components, integrated circuits (ICs) for each component, or a monolithic integrated circuit.

11. A method of driving an OLED (organic light-emitting diode) panel load, said method comprising the following steps:

providing an Inverting Buck-Boost Converter (IBBC) to receive an input DC voltage and drive the OLED panel load with a regulated output voltage;

providing a first DC-DC converter to generate a reference ground and drive associated control circuits;

providing an additional DC-DC converter to provide bias power higher than the input DC voltage to the OLED panel load, whereby completely turning off a thin film transistor connected in series with the OLED; and utilizing the input DC voltage as a reference voltage for the IBBC and the first DC-DC converter.

* * * * *